US012362914B1

(12) United States Patent
Ibrahim et al.

(10) Patent No.: US 12,362,914 B1
(45) Date of Patent: Jul. 15, 2025

(54) NETWORK AUTHENTICATION WITH CRYPTOGRAPHIC CORPOCESSORS

(71) Applicant: American Express Travel Related Services Company, Inc., New York, NY (US)

(72) Inventors: Wael Ibrahim, San Diego, CA (US); Manik Biswas, Burgess Hill (GB); Manish K. Deliwala, Chandler, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 573 days.

(21) Appl. No.: 16/600,213

(22) Filed: Oct. 11, 2019

(51) Int. Cl.
*H04L 9/08* (2006.01)
*H04L 9/32* (2006.01)

(52) U.S. Cl.
CPC .......... *H04L 9/0825* (2013.01); *H04L 9/0861* (2013.01); *H04L 9/0894* (2013.01); *H04L 9/3213* (2013.01); *H04L 9/3234* (2013.01)

(58) Field of Classification Search
CPC ... H04L 9/0825; H04L 9/0861; H04L 9/0894; H04L 9/3234
See application file for complete search history.

(56) References Cited

U.S. PATENT DOCUMENTS

| | | | | |
|---|---|---|---|---|
| 2005/0154889 A1* | 7/2005 | Ashley | ................... | H04L 9/0822 713/171 |
| 2008/0130893 A1* | 6/2008 | Ibrahim | ................. | G06F 21/572 380/277 |
| 2010/0088523 A1* | 4/2010 | Wooten | ................. | H04L 9/0897 713/189 |
| 2012/0297183 A1* | 11/2012 | Mukkara | ............... | H04L 9/0894 713/153 |
| 2018/0144114 A1* | 5/2018 | Fiske | ....................... | G06F 21/32 |
| 2018/0159843 A1* | 6/2018 | Saja | ........................ | H04L 9/0894 |
| 2020/0067922 A1* | 2/2020 | Avetisov | ............. | H04L 63/0823 |

* cited by examiner

*Primary Examiner* — Harris C Wang
(74) *Attorney, Agent, or Firm* — Thomas | Horstemeyer, LLP (57) ABSTRACT

Disclosed are various embodiments for authentication with network connected computing resources using a cryptographic coprocessor installed on a client device. A request can be sent to the client device to provision an asymmetric encryption key-pair using a cryptographic coprocessor installed on the client device, wherein the request comprises a key-authorization credential for the asymmetric encryption key-pair and the asymmetric encryption key-pair comprises a public key and a private key. The public key of the asymmetric encryption key-pair and an identity public key for the cryptographic coprocessor can be received. The public key, key-authorization credential, and the identity public key can then be stored in association with each other.

20 Claims, 5 Drawing Sheets

NETWORK AUTHENTICATION WITH CRYPTOGRAPHIC CORPOCESSORS

BACKGROUND

Authentication of a user or client device is sometimes required to access computing resources or content on a network. For example, a web page or website might be password protected. Computing resources that require additional security may require that a user or a device submit multiple factors of authentication. However, applications executing on the client device may not always be trustworthy. For example, a web browser could be hacked or compromised, allowing an attacker to intercept, capture, or manipulate any authentication factors or credentials provided by the user.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for authentication with network connected computing resources using a cryptographic coprocessor installed on a client device. Cryptographic operations can be performed using the cryptographic coprocessor instead of in software by a client application, such as an untrusted browser. These cryptographic operations can allow for secure authentication with a remote computing device, resource, or service by a user of the client device without involvement of the client application. Instead the client application can be reduced to a relay or proxy role, where authentication messages are passed between the protected computing resource or service and the cryptographic coprocessor. To prevent the client application from intercepting the authentication messages, they can be encrypted using a session key that can be regularly renegotiated between the protected computing resource or service and the cryptographic coprocessor to provide forward secrecy or (perfect) forward secrecy. In the following discussion, a general description of the system and its components is provided, followed by a discussion of the operation of the same.

Figure 1:
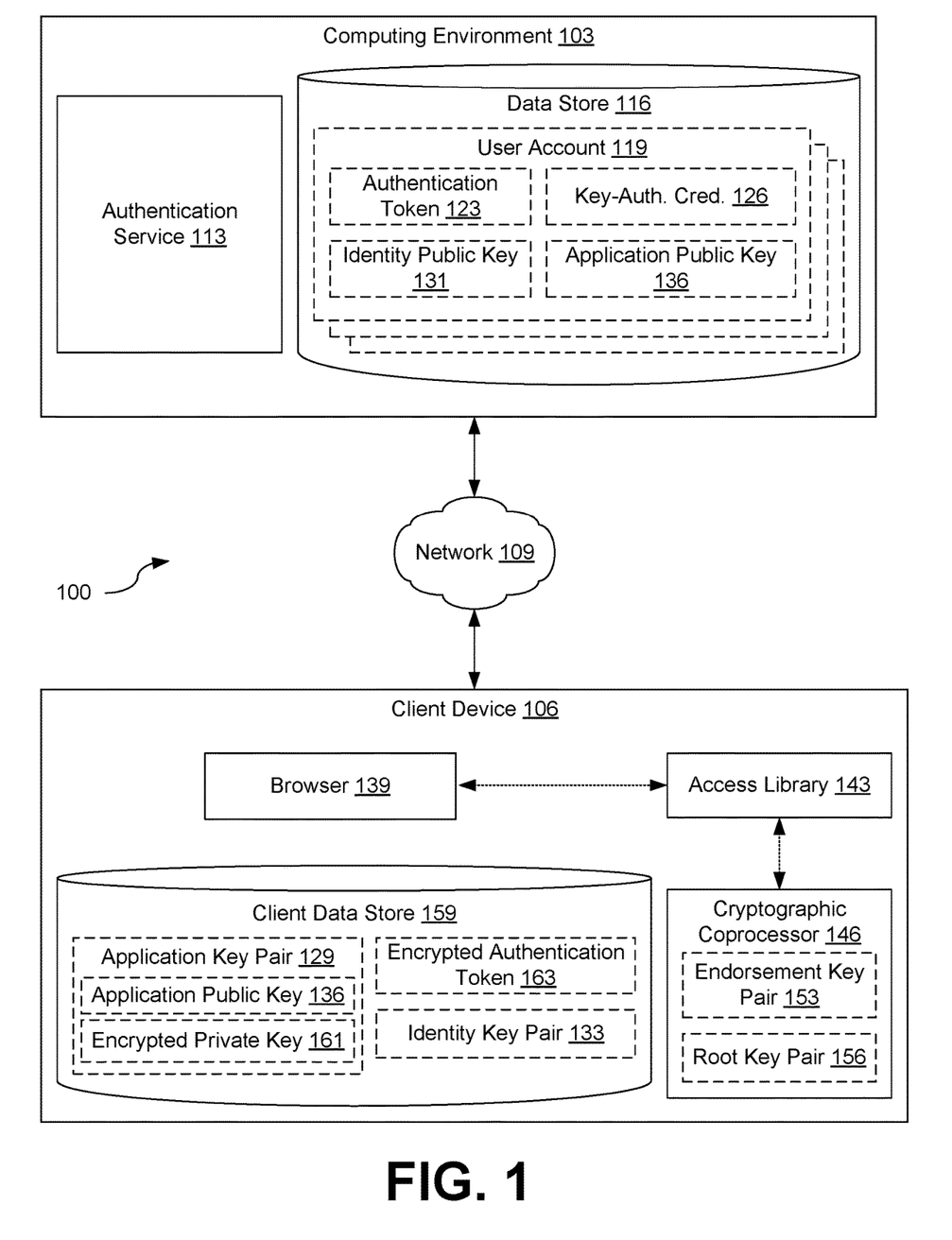
FIG. 1 is a drawing of a network environment according to various embodiments of the present disclosure.

With reference to FIG. 1, shown is a network environment 100 according to various embodiments. The network environment 100 includes a computing environment 103 and a client device 106, which are in data communication with each other via a network 109. The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include an authentication service 113, and other applications, services, processes, systems, engines, or functionality not discussed in detail herein.

The authentication service 113 can be executed to authenticate a user or a client device 106 operated by a user using various approaches discussed later. Once a user or client device 106 is authenticated with the authentication service 113, the user or client device 106 may be permitted to access the various other applications, services, processes, systems, engines, etc. hosted by the computing environment 103.

Also, various data is stored in a data store 116 that is accessible to the computing environment 103. The data store 116 can be representative of a plurality of data stores 116, which can include relational databases, non-relational databases, object-oriented databases, hierarchical databases, hash tables or similar key-value data stores, as well as other data storage applications or data structures. The data stored in the data store 116 is associated with the operation of the various applications hosted by the computing environment 103. This data can include one or more user accounts 119 and potentially other data.

Each user account 119 represents information associated with an individual user whose identity can be verified by the authentication service 113. Accordingly, information about the identity of the user and information that can be used to authenticate a user or the client device 106 of a user can be stored in the user account 119. This information can include an authentication token 123, a key-authorization credential 126, an identity public key 131, and an application public key 136.

The authentication token 123 can represent an identifier that can be used to uniquely identify a user or a client device 106 associated with a user. For example, if a client device 106 sends a request to the authentication service 113 to access a computing resource (e.g., a server, web-application, web-site, etc.) and the request includes that authentication token 123, the authentication service 113 can determine both the identity of the user and that the user has been previously authenticated on that client device 106. In some implementations, the authentication token 123 can be used to provide an alternative form of authentication. If the authentication service 113 receives a copy of the authentication token 123, it may automatically allow access to a protected computing resource to the client device 106 as a matter of convenience for the user. In other implementations, the authentication token 123 can be used as an additional factor of authentication. For instance, if the authentication service 113 receives user credentials as part of a request to access a protected computing resource, the authentication service 113 may require that the client device 106 also provide either an authentication token 123 or another, additional authentication factor (e.g., a one-time password) before granting access to the client device 106 on behalf of the user. Examples of authentication tokens 123 include persistent cookies, cryptograms, universally unique identifiers (UUIDs), globally unique identifiers (UUIDs), etc.

In some implementations, multiple authentication tokens 123 may be stored in association with a user account 119. In these implementations, a unique authentication token 123 may be assigned to each client device 106 that a user has authorized to access the authentication service 113. For example, one authentication token 123 could be assigned to a user's personal computer, while another authentication token 123 could be assigned to a user's mobile phone. Usage of multiple authentication tokens 123 can allow for the authentication service 113 to provide per device access control on behalf of a user.

The key-authorization credential 126 can represent a credential that is used to protect or access a respective private key for an asymmetric encryption key-pair, such as an application key-pair 129 or a root key-pair 156. The application key-pair 129 and root key-pair 156 will be discussed in further detail in the discussion of the client device 106. However, the key-authorization credential 126 can be a binary or alphanumeric value which can be used to decrypt or otherwise access the respective private key for an application key-pair 129. Where multiple application key-pairs 129 are present on a client device 106, multiple respective key-authorization credentials 126 can be stored for the user account 119. In these implementations, each key-authorization credential 126 can be stored in association with a key identifier for the respective private key of an application key-pair 129 or a root key-pair 156 to allow the authentication service 113 to determine which key-authorization credential 126 is to be used to access a particular private key of an application key-pair 129 or root key-pair 156.

The identity public key 131 can represent the public key of a respective identity key-pair 133, which is further described in the discussion of the client device 106. The identity public key 131 can be used to verify the identity of messages or data originating from a client device 106. For example, a message signed with the private key of an identity key-pair 133 for a client device 106 could be verified with a respective identity public key 131 as originating from a specific client device 106 because of the unique identity of the cryptographic coprocessor 146 installed on the client device 106

The application public key 136 can represent the public key of a respective application key-pair 129 stored on the client device 106. The application public key 136 can be used to encrypt data to be sent to the client device 106 or to be stored on the client device 106, according to various embodiments of the present disclosure.

The client device 106 is representative of one or more client devices 106 that can be coupled to the network 109. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can execute various applications such as a browser 139 and an access library 143. The client device 106 can also include a cryptographic coprocessor 146 that can perform various cryptographic operations.

The browser 139 can be executed in a client device 106 to access network content served up by the computing environment 103 or other servers, thereby rendering a user interface on the display. For example, when requesting a web page, the browser 139 could download content for rendering on the display. Moreover, the web page could include one or more scripts that could be executed by the browser 139 to perform one or more actions.

The access library 143 can be a programmatic library, module, plugin, or standalone executable or service that provides an interface between the browser 139 and the cryptographic coprocessor 146. For example, the access library 143 can provide an application programming interface (API) that includes multiple functions that, when invoked by the browser 139, cause the cryptographic coprocessor 146 to perform a cryptographic operation. The functions of the API could then provide the result of the cryptographic operation to the browser 139.

While there are many cryptographic functions that could be provided by the API of the access library 143, several examples are provided herein to illustrate the principles of the access library 143. As a first example, the access library 143 could perform an exchange of data through a key-exchange or key-agreement protocol. The data to be transmitted and the destination could be provided as arguments to the function, and the access library could negotiate a secure channel and transmit the data to the destination. As a second example, the access library 143 could cause the cryptographic coprocessor 146 to generate a symmetric encryption key or asymmetric encryption key-pair and provide the encryption key or key-pair as a result. As a third example, the access library 143 could cause the cryptographic coprocessor 146 to import or store an encryption key or key-pair provided as an argument (e.g., an encryption key or key-pair provided by the browser 139). As a fourth example, the access library 143 could cause the cryptographic coprocessor 146 to sign data provided as or identified in a first argument using an encryption key or key-pair provided as or identified in a second argument to an API call. Similarly, the access library 143 could cause the cryptographic coprocessor 146 to encrypt or decrypt data provided as or identified in a first argument using an encryption key or key-pair provided as or identified in a second argument to an API call.

The access library 143 can be implemented separately from the browser 139 to provide additional security for interactions between the client device 106 and the authentication service 113 which utilize the browser 139. Accordingly, the access library 143 could provide an application programming interface (API) that can be invoked by the browser 139 to allow an authentication service 113 to make use of one or more functions provided by the cryptographic coprocessor 146 independently of the browser 139. For example, a browser 139 can be compromised and used to intercept or modify sensitive communications between the client device 106 and the authentication service 113. As another example, a browser 139 could be compromised to gain unauthorized access to data stored on the client device 106. By implementing an access library 143 independent from the browser 139, the authentication service 113 can make use of the functionality of the cryptographic coprocessor 146 without having to trust or rely upon the state of the browser 139.

The cryptographic coprocessor 146 can represent a physical or emulated dedicated microcontroller that secures hardware using integrated cryptographic keys and provides various cryptographic operations. One example of a physical cryptographic coprocessor 146 include those embodied as an application specific integrated circuit (ASIC) which may be unalterable after it is manufactured. Another example of a physical cryptographic coprocessor 146 can include a programmable chip or chipset with programmable firmware that implements the functions provided by the cryptographic coprocessor 146. Accordingly, one example of a cryptographic coprocessor 146 can be a microcontroller that implements a version of the trusted platform module (TPM) standard, which may be referred to as a TPM chip or TPM module. Although the cryptographic coprocessor 146 may be preferentially implemented in hardware (e.g., as an ASIC or a firmware-based solution) to prevent tampering with or circumvention of the cryptographic coprocessor 146, the functionality of the cryptographic coprocessor 146 can be implemented in software on those client devices 106 that lack a hardware-based cryptographic coprocessor 146.

The cryptographic coprocessor 146 can perform various cryptographic functions or operations on behalf of the client device 106 or applications executed by the client device 106. For example, the cryptographic coprocessor 146 may generate random numbers using a pseudorandom number generator (PRNG) or true random number generator (TRNG) included in the cryptographic coprocessor 146. As another example, the cryptographic coprocessor 146 can securely generate cryptographic keys or key-pairs, including symmetric encryption keys and asymmetric encryption key-pairs. The cryptographic coprocessor 146 can also encrypt or decrypt data using a cryptographic key generated by or imported into the cryptographic coprocessor 146. As another example, the cryptographic coprocessor 146 can also generate a hash of the current state of the hardware and software configuration of the client device 106, which can allow for remote attestation of the identity of the client device 106 or user of the client device 106.

To perform these operations, various cryptographic keys can be stored within the cryptographic coprocessor 146. These can include an endorsement key-pair 153 and a root key-pair 156. The endorsement key-pair 153 and the root key-pair 156 may be stored within the cryptographic coprocessor 146 itself in order to protect the keys from compromise.

The endorsement key-pair 153 is an asymmetric key-pair that includes a public and private key that are unique to the cryptographic coprocessor 146. The endorsement key-pair 153 can be used by the cryptographic coprocessor 146 to verify or assert its identity, and therefore the identity of the client device 106 or user of the client device 106, to other parties or devices. Should the endorsement key-pair 153 be disclosed to a third-party, the third-party could potentially forge the identity of the cryptographic coprocessor 146. Therefore, the endorsement key-pair 153 is generally used to create or sign other objects, which may then be used to assert or verify the identity of the cryptographic coprocessor 146. To preserve the integrity of the endorsement key-pair 153 and ensure that the endorsement key-pair 153 is unique with respect to other endorsement key-pairs 153 installed on other cryptographic coprocessors 146, the endorsement key-pair 153 can be provisioned and stored on the cryptographic coprocessor 146 at the factory.

The root key-pair 156 can be an asymmetric encryption key-pair that can be used by the secure cryptographic coprocessor 146 to encrypt and/or sign data. The root key-pair 156 can be replaced if required, although any data encrypted with the root key-pair 156 will be unrecoverable if the root key-pair 156 is replaced with a new root key-pair 156. In some implementations, the cryptographic coprocessor 146 can support the use of multiple, independent root key-pairs 156. For example, multiple users of a client device 106 could each have his or her root key-pair 156 that is accessible only to a respective user. As another example, multiple client applications executing on the client device 106 could have their own root key-pairs 156 for encrypting and decrypting application specific data stored on the client device 106.

Also, various data can be stored in a client data store 159 that is accessible to the client device 106. The client data store 159 can be representative of a plurality of client data stores 159, which can include relational databases, object-oriented databases, hierarchical databases, hash tables or similar key-value data stores, as well as other data storage applications or data structures. The data stored in the client data store 159 is associated with the operation of the various applications executed by the client device 106. This data can include one or more application key-pairs 129, an encrypted authentication token 163, an identity key-pair 133, and potentially other data.

The application key-pairs 129 are asymmetric encryption key-pairs that can be generated by or imported into the cryptographic coprocessor 146 and used for various data encryption functions. Each application key-pair 129 can be a child, grandchild, or descendant key of a respective root key-pair 156. Moreover, each root key-pair 156 can have one or more application key-pairs 129 associated with it. For example, a user might create multiple application key-pairs 129 for various uses, and these application key-pairs 129 could be stored as subkeys or child keys of the root key-pair 156 for the user. Similarly, a client application that has provisioned its own root key-pair 156 could use multiple application key-pairs 129 for various purposes, and one or more of these application key-pairs 129 could be stored as subkeys of the root key-pair 156 provisioned for the client application.

As an example, the browser 139 could provision a root key-pair 156 on behalf of the authentication service 113. Multiple application key-pairs 129 could then be created as subkeys of the root key-pair 156 created for the authentication service 113. For instance, a first application key-pair 129 could be created for use in a challenge response protocol with the authentication service 113 when using a browser 139, while a second application key-pair 129 could be created for use when the client device 106 authenticates with the authentication service 113 through another channel (e.g., authentication through a dedicated or standalone application).

As an alternative example, the browser 139 could provision a root key-pair 156 for itself. It could then provision as subkeys individual application key-pairs 129 for different authentication services 113. Access to these application key-pairs 129 would be limited to interactions with the authentication service 113 (e.g., by protecting them with a key-authorization credential 126 only known to the authentication service 113). It should be noted that when reference is made to the use of an application key-pair 129, both implementations regarding how the application key-pair 129 is related to a root key-pair 156 are encompassed.

Each application key-pair 129 can include an application public key 136 and an encrypted private key 161. The encrypted private key 161 can be encrypted and decrypted using the respective key-authorization credential 126 stored in the data store 116 of the computing environment 103. Accordingly, the encrypted private key 161 can only be accessed by an application executing on the client device 106 when the authentication service provides a copy of the key-authorization credential 126 to the client device 106, as discussed in further detail later.

The encrypted authentication token 163 represents a locally stored copy of the authentication token 123 in encrypted form. The encrypted authentication token 163 may be stored in encrypted form to prevent theft of the authentication token 123. The authentication token 123 can be encrypted by the cryptographic coprocessor 146 to generate the encrypted authentication token 163 using an appropriate application key-pair 129 and decrypted by the cryptographic coprocessor 146 using the appropriate application key-pair 129.

The identity key-pair 133 represents a locally stored asymmetric encryption key-pair that can be generated and used by the cryptographic coprocessor 146 to verify its identity. For example, a message signed with the private key of the identity key-pair 133 could be verified with the identity public key 131 as originating from a specific client device 106 because of the unique identity of the cryptographic coprocessor 146 installed on the client device 106. Accordingly, the identity key-pair 133 may be used as an alias for the endorsement key-pair 153. To prove that the identity key-pair 133 is valid, it may be signed by the cryptographic coprocessor 146 using the endorsement key-pair 153.

Next, a general description of the operation of the various components of the network environment 100 is provided. Although the following description provides one example of the operation of and interaction between the various components of the network environment 100, other operations or interactions may also occur, as discussed later in the accompanying description of subsequent figures.

To begin, the authentication service 113 can receive a request from a client device 106 to authenticate for a first time with the authentication service 113. This first authentication request may occur, for example, when a user is using a client device 106 for the first time to access a computing resource protected by the authentication service 113. For example, a browser 139 executing on a client device 106 may request access to a web page or website for a first time. In response, the authentication service 113 can verify the identity of the user (e.g., by verifying a user name, password, and/or other authentication factor or credential provided by the client device 106). Once the user has been successfully authenticated, the authentication service 113 may provision or otherwise configure the client device 106 for subsequent authentication with the authentication service 113.

First, the authentication service 113 can generate an authentication token 123 and a key-authorization credential 126. For example, the authentication service 113 may generate random values for use as the authentication token 123 and the key-authorization credential 126. The authentication service 113 can then store the authentication token 123 and the key-authorization credential 126 in the data store 116.

Next, the authentication service 113 can initiate a secure communications channel with the access library 143. For example, the authentication service 113 could send a command to the browser 139 to invoke a function of an API provided by the access library 143. The command could include a shared cryptogram to be used as the basis for a key-exchange or key agreement algorithm (e.g., Diffie-Helman Key Exchange or Elliptic Curve Diffie-Helman (ECDH)). Additional messages between the access library 143 and the authentication service 113 could be relayed by the browser 139 to allow the authentication service 113 and the access library 143 to agree on a session key.

Using the session key, the authentication service 113 can encrypt the key-authorization credential 126 and provide it to the browser 139. The browser 139 can then provide the encrypted key-authorization credential 126 to the access library 143 as an argument to an API function for creating an application key-pair 129 for future use by the authentication service 113. The access library 143 can then cause the cryptographic coprocessor 146 to generate an application key-pair 129. Once generated, the access library 143 can decrypt the key-authorization credential 126 using the session key. The access library 143 can then protect access to the private key of the application key-pair 129 by encrypting the private key of the application key-pair 129 with the decrypted key-authorization credential 126 to generate an encrypted private key 161. The application key-pair 129, including the encrypted private key 161 and the application public key 136, can then be stored by the access library 143 in the client data store 159. The access library 143 can also return a copy of the application public key 136 to the authentication service 113, which in turn can store the application public key 136 in the respective user account 119 in the data store 116.

Next, the authentication service 113 can encrypt the authentication token 123 using the application public key 136 generated by the cryptographic coprocessor 146 and provided by the access library 143 to create an encrypted authentication token 163. In some implementations, however, the encrypted authentication token 163 can be further encrypted by the authentication service 113 using the previously agreed upon session key. The encrypted authentication token 163 is then sent to browser 139, which can provide the encrypted authentication token 163 to the access library 143 for storage in the client data store 159. If additionally encrypted with the session key, the access library 143 may decrypt the second layer of encryption using the session key prior to storing the encrypted authentication token 163 in the client data store 159.

In response to receiving the encrypted authentication token 163 from the authentication service 113, the access library 143 can provide a copy of the identity public key 131 to the authentication service 113. In some instances, the identity public key 131 can be encrypted in transit between the access library 143 and the authentication service using the previously negotiated session key. The authentication service 113 can then store the identity public key 131 in association with the authentication token 123 assigned to the client device 106. This association between the identity public key 131 and the authentication token 123 can allow the authentication service 113 to verify that the authentication token 123 is received from the appropriate client device 106 in future authentication operations.

At some later point in time, the client device 106 can attempt to authenticate with the authentication service 113 again. For example, the browser 139 may request an authentication web page provided by the authentication service 113.

To begin the subsequent authentication, the authentication service 113 can send a request to the browser 139 to invoke an API function provided by the access library 143 to negotiate a second session key. The request may include a second, different random value to use as a basis for creation of the second session key. This can ensure forward secrecy or perfect forward secrecy between the communications related to the prior provisioning of the client device 106 and the current authentication of the client device 106.

Once the authentication service 113 and the access library 143 have agreed upon a second session key, the authentication service 113 can encrypt a copy of the key-authorization credential 126 using the agreed upon second session key. The authentication service 113 can then send the encrypted key-authorization credential 126 to the browser 139, which relays it to the access library 143. The access library 143 can then decrypt the encrypted key-authorization credential 126 using the second session key.

Now that it is in possession of the unencrypted version of the key-authorization credential 126, the access library 143 can decrypt the encrypted private key 161 of the application key-pair 129 using the key-authorization credential 126. The decrypted version of the encrypted private key 161 can, in turn, be used to decrypt the encrypted authentication token 163 to recover the authentication token 123. To prove that client device 106 has been previously authorized to use the authentication token 123, the access library 143 can create a digital signature of the authentication token 123 using the private key of the identity key-pair 133. The authentication token 123 and the signature can then be encrypted with the second session key by the access library 143. These encrypted versions of the authentication token 123 and signature can then be provided by the access library 143 to the browser 139, which in turn sends them to the authentication service 113. The authentication service 113 can then decrypt the received authentication token 123 and corresponding signature using the second session key. After confirming that the authentication token 123 stored in the data store 116 matches the version provided by the access library 143 and verifying the signature using the identity public key 131, the authentication service 113 can authorize the client device 106 to access the requested computing resource.

As illustrated, at no point was the browser 139 able to view any authentication information in its unencrypted form. Because the previous exchanges were encrypted using the session key agreed upon by the authentication service 113 and the access library 143, the untrusted browser 139 is unable to view or intercept the plain-text authentication token 123, key-authorization credential 126, identity public key 131, application public key 136, or any cryptographic signatures as they are exchanged between the authentication service 113 and the access library 143.

Figure 2:
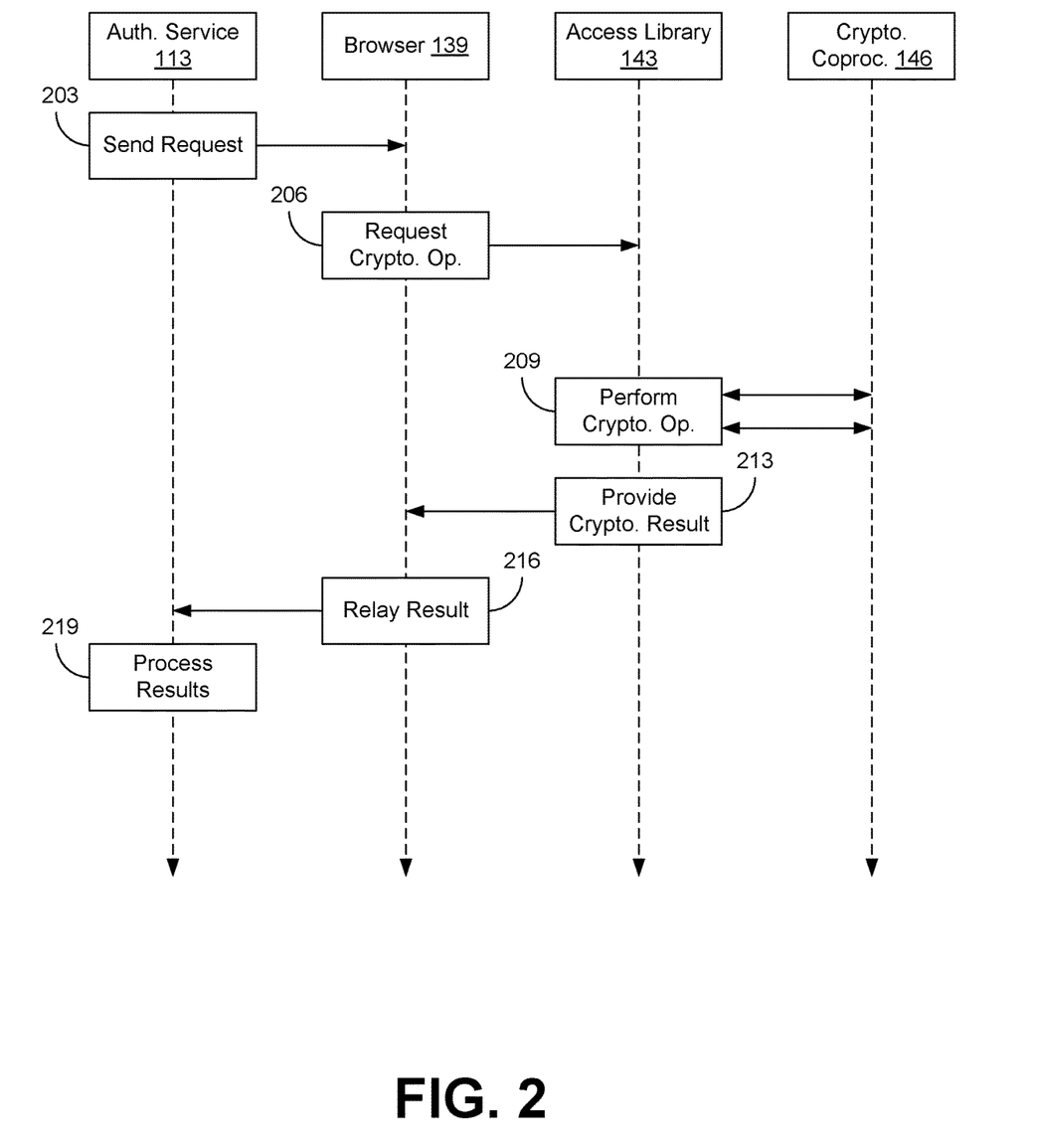
FIG. 2 is a sequence diagram illustrating one example of functionality implemented in the network environment of FIG. 1 according to various embodiments of the present disclosure.

Referring next to FIG. 2, shown is a sequence diagram that provides a generic example of the interactions between various components of the network environment 100 according to various embodiments of the present disclosure. The purpose of FIG. 2 is to illustrate the interactions of the components of the network environment 100 prior to discussing the detailed interactions of particular work flows in the subsequent figures. The sequence diagram of FIG. 2 provides merely an example of the many different types of functional arrangements that can be employed in the network environment 100. As an alternative, the sequence diagram of FIG. 2 can be viewed as depicting an example of elements of a method implemented within the network environment 100.

Beginning with box 203, the authentication service 113 can send a request to the browser 139 to perform a cryptographic operation. This request could be included in or related to an authentication request sent to the browser 139. For example, the authentication service 113 could send a request for authentication credentials (e.g., a username and a password, an encrypted authentication token 163, etc.) to the browser 139. The request for the authentication credentials could be sent, for example, in response to a request from the browser 139 to access a computing resource protected by the authentications service 113.

For instance, a website could contain a link to an access controlled webpage. When a user clicked on the link, the browser 139 could have sent a hypertext transport protocol (HTTP) request for the content. In response, the authentication service 113 could have sent an authentication request to the browser 139. The authentication request could further involve the browser 139 supplying the result of a cryptographic operation from the cryptographic coprocessor 146 of the client device 106, providing authentication data to the authentication service 113 in encrypted form, or provisioning one or more encryption keys on the client device 106 for future use.

Next at box 206, the browser 139 can send a request to the access library 143 for the cryptographic coprocessor 146 to perform a cryptographic operation. For example, the browser 139 could invoke a function provided by an API of the access library 143, supplying the function with one or more arguments provided by the authentication service 113. One or more of these arguments could be encrypted using a session key negotiated by the authentication service 113 and the access library 143 in order to prevent the browser 139 from learning the contents of the arguments.

The cryptographic operation could include any arbitrary computation or sequence of computations involving the cryptographic coprocessor 146. One example of a requested cryptographic operation could be to sign an encrypted authentication token 163 to verify the source of the encrypted authentication token 163. Another example could be to use an application public key 136 to encrypt some data. Similarly, the requested cryptographic operation could include accessing an encrypted private key 161 using a key-authorization credential 126 and then using the decrypted version of the private key 161 to decrypt an encrypted item of data.

Then at box 209, the access library 143 can utilize the cryptographic coprocessor 146 to perform the requested cryptographic operation. Accordingly, the access library 143 could invoke one or more system calls provided by an operating system of the client device 106 or device driver for the cryptographic coprocessor 146 to perform specific cryptographic operations. For instance, if a signed version of the encrypted authentication token 163 were requested by the authentication service 113, the access library 143 could invoke the appropriate system calls to cause the cryptographic coprocessor 146 to use a respective private key of the identity key-pair 133 to generate a cryptographic signature for the encrypted authentication token 163. As another example, if the authentication service 113 had requested that a new root key-pair 156 or application key-pair 129 be provisioned, the access library 143 could invoke one or more system calls to cause the cryptographic coprocessor 146 to generate and store a new root key-pair 156 or application key-pair 129. As a third example, if the authentication service 113 were negotiating a session key with the access library 143 for the transmission of data, the access library 143 could invoke one or more system calls to cause the cryptographic coprocessor 146 to perform any needed cryptographic operations related to the agreement or exchange of the session key. As a fourth example, if the authentication service 113 were requesting that the access library 143 encrypt some piece of data provided by or identified by the authentication service 113 using a particular encryption key, such as the application public key 136, then the access library 143 could invoke one or more system calls to cause the cryptographic coprocessor 146 to encrypt the data with the specified key.

Proceeding to box 213, the access library 143 can provide the result of the cryptographic operation to the browser 139. To protect the results from interception by the browser, the access library 143 could encrypt the results using a session key negotiated between the authentication service 113 and the access library 143.

Then at box 216, the browser 139 can relay the results of the cryptographic operation to the authentication service. For example, the browser 139 could include the results in an HTTP response to the request received at box 203.

Finally, at box 219, the authentication service 113 can process the result of the cryptographic operation. This can include decrypting the result if it was encrypted with a session key.

Figure 3:
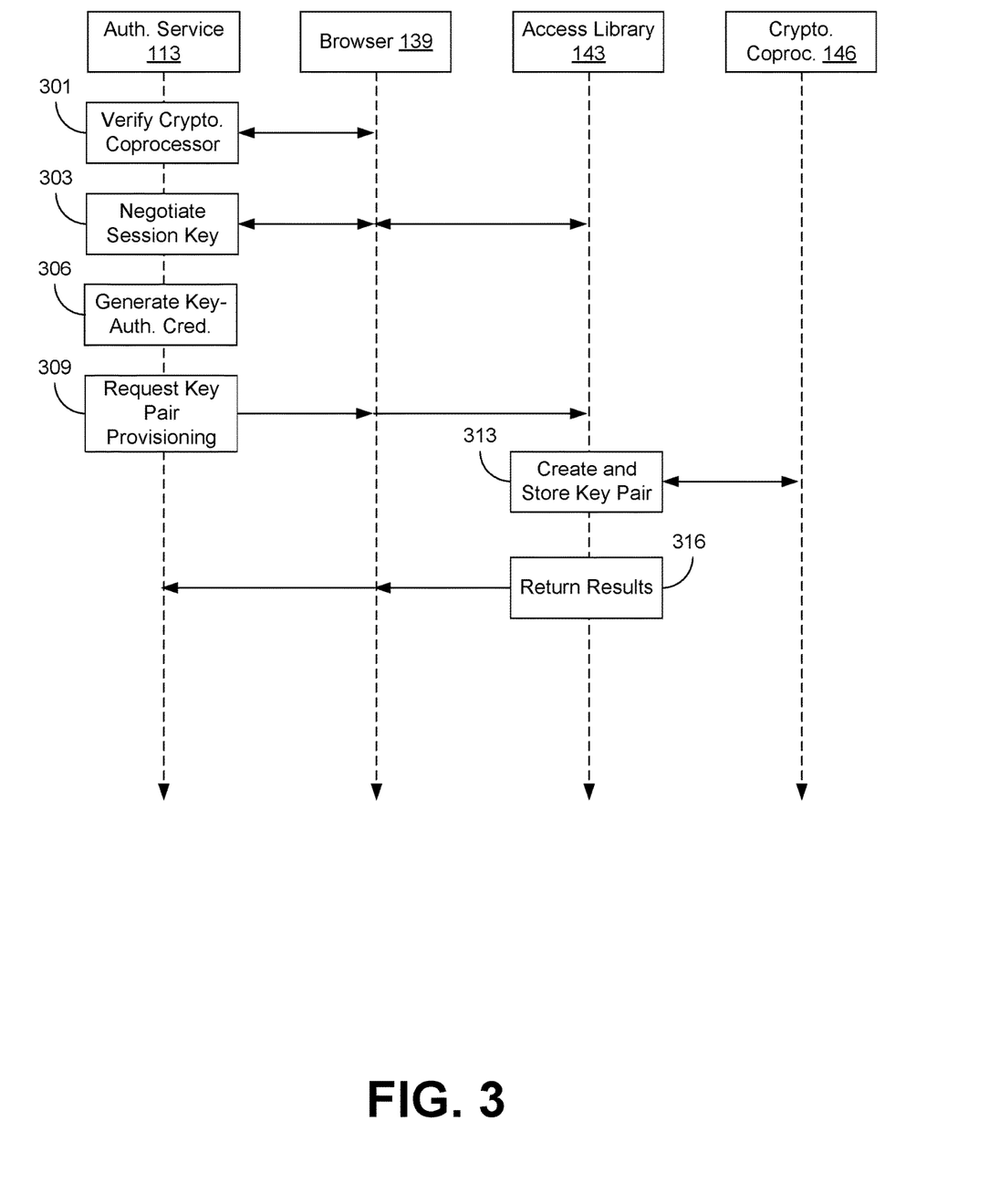
FIG. 3 is a sequence diagram illustrating one example of functionality implemented in the network environment of FIG. 1 according to various embodiments of the present disclosure.

Referring next to FIG. 3, shown is a sequence diagram that provides an example of the interactions between various components of the network environment 100 according to various embodiments of the present disclosure. The sequence diagram of FIG. 3 provides merely an example of the many different types of functional arrangements that can be employed in the network environment 100. As an alternative, the sequence diagram of FIG. 3 can be viewed as depicting an example of elements of a method implemented within the network environment 100.

Beginning with box 301, the authentication service 113 can verify that a client device 106 has a cryptographic coprocessor 146 installed and enabled. This could be done through several approaches. For example, the authentication service 113 could evaluate a request from the browser 139 to determine whether the browser 139 has specified that a cryptographic coprocessor 146 is installed on the client device 106. For example, one or more HTTP headers in a request from the browser could indicate the presence of a cryptographic coprocessor 146 on the client device 106. As another example, the authentication service could evaluate a custom HTTP header from the browser 139 to see if the browser 139 has specified that the access library 143 is installed on the client device 106. In these implementations, the presence of the access library 143 could be used as a proxy for the presence of a cryptographic coprocessor 146.

Moving on to box 303, the authentication service 113 and the access library 143 can negotiate a session key to protect further communications from being intercepted or compromised by the browser 139. Any cryptographic key-exchange or key-agreement protocol can be used. Examples of such protocols include Diffie-Hellman Key Exchange (DHKE), Elliptic Curve Diffie-Hellman (ECDH) Key Exchange, and similar protocols. Any subsequent communications between the authentication service 113 and the access library 143 can then be encrypted before being relayed through the browser 139.

At box 306, the authentication service 113 can generate a key-authorization credential 126. The key-authorization credential 126 can be generated randomly or pseudorandomly. For example, a true random number generator (TRNG) or pseudorandom number generator (PRNG) could be used to generate a random length series of bits that could be used as key-authorization credential 126.

Then at box 309, the authentication service 113 can send a request for a key-pair to be provisioned. Specifically, the authentication service 113 could send the request to the browser 139. Upon receipt, the browser 139 could relay the request to the access library 143 (e.g., by invoking an API provided by the access library 143).

The key-pair for which provisioning is requested could be a root key-pair 156 or an application key-pair 129 to be provisioned as a child or subkey of an existing root key-pair 156. The request can include the key-authorization credential 126 that was generated. If the key to be provisioned is a subkey of an existing root key-pair 156, an additional key-authorization credential 126 for the root key-pair 156 could be included in the request. If there are multiple key-pairs in the key-hierarchy between the key to be provisioned and the root key-pair 156, key-authorization credentials 126 for these additional key-pairs could also be included in the request. Alternatively, the access library 143 could recursively request from the authentication service 113 the key-authorization credential 126 for each intermediate key-pair in a key hierarchy. The authentication service 113 could then provide each requested key-authorization credential 126 in response.

At box 313, the access library 143 can create and store a key-pair (e.g., an application key-pair 129 or root key-pair 156) on behalf of the authentication service 113. For instance, the access library 143 could invoke a system call provided by the operating system of the client device 106 or a device driver for the cryptographic coprocessor 146 to generate a new key-pair. The access library 143 could then use the key-authorization credential 126 to encrypt the private key of the generated key-pair.

For instance, if creating an application key-pair 129 that will be stored outside of the cryptographic coprocessor 146, the key-authorization credential 126 could be used to encrypt the private key to create an encrypted private key 161 using a version of the Public-Key Cryptography Standards (PKCS), including various versions of the PKCS #12, PKCS #8 and/or PKCS #5 standards. Similarly, the private key of a root key-pair 156 could be encrypted using the key-authorization credential 126. If encrypted, further usage of a private key is limited to an authorized application, as represented by possession of an appropriate key-authorization credential 126.

Finally, at box 316, the access library 143 can return the results of the provisioning operation performed at box 313. For example, if a new application key-pair 129 were created, a copy of the application public key 136 could be returned along. In addition, an identifier of the application key-pair 129 could also be returned. If a root key-pair 156 were provisioned, then an identifier of the root key-pair 156 might be returned, although if the public key of the root key-pair 156 were permitted to be exported from the cryptographic coprocessor 146, it could be returned as well. In some implementations, the identity public key 131 could also be returned to allow for future operations performed with the provisioned key-pair to be validated or verified as originating from the client device 106 instead of an unauthorized device. To return the results of the cryptographic operation, the results would be provided to the browser 139 as a result of the function invoked by the browser at box 309. The browser 139 could then provide the results as a response to the authentication service 113.

Figure 4:
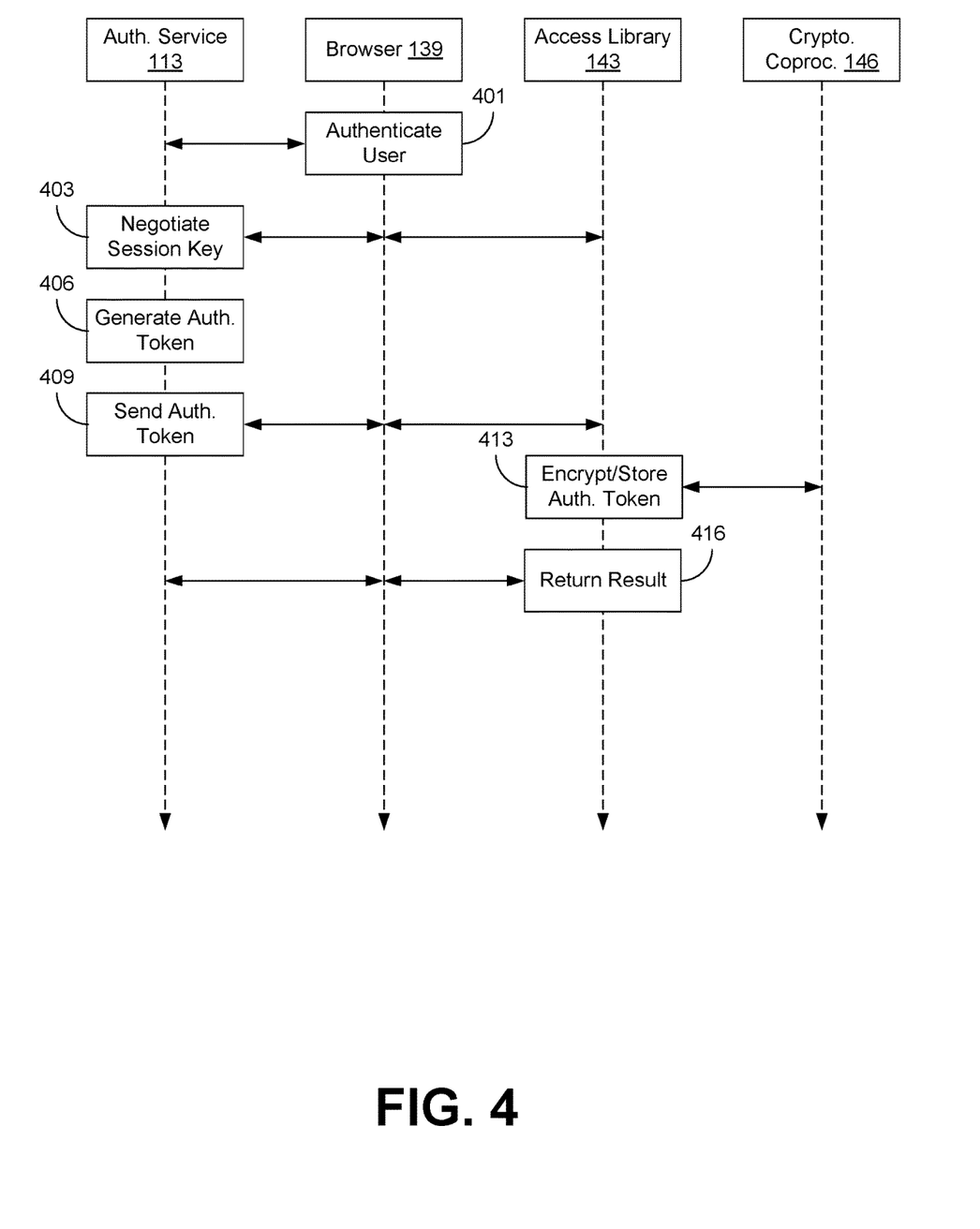
FIG. 4 is a sequence diagram illustrating one example of functionality implemented in the network environment of FIG. 1 according to various embodiments of the present disclosure.

Referring next to FIG. 4, shown is a sequence diagram that provides an example of the interactions between various components of the network environment 100 according to various embodiments of the present disclosure. The sequence diagram of FIG. 4 provides merely an example of the many different types of functional arrangements that can be employed in the network environment 100. As an alternative, the sequence diagram of FIG. 4 can be viewed as depicting an example of elements of a method implemented within the network environment 100.

Beginning with box 401, the browser 139 can authenticate with the authentication service 113. For example, in response to a request to access protected or restricted content, the authentication service 113 could request that the browser 139 authenticate or otherwise verify the identity of the user of the client device 106. Accordingly, the browser 139 could provide a username, password, and potentially other factors of authentication (e.g., a one-time password). After verifying the username, password, and potentially other factors of authentication, the authentication service 113 could verify that the user is authorized to access the requested content.

Proceeding to box 403, the authentication service 113 and the access library 143 can negotiate a session key to protect further communications from being intercepted or compromised by the browser 139. Any cryptographic key-exchange or key-agreement protocol can be used. Examples of such protocols include Diffie-Hellman Key Exchange (DHKE), Elliptic Curve Diffie-Hellman (ECDH) Key Exchange, and similar protocols. Any subsequent communications between the authentication service 113 and the access library 143 can then be encrypted before being relayed through the browser.

Then at box 406, the authentication service 113 can generate an authentication token 123. This may occur, for example, in response to the previous authentication of a user by the browser 139 at box 401. The authentication token 123 could be generated by assembling a random or pseudorandom sequence of numbers and/or characters of a predefined or prespecified length.

Next at box 409, the authentication service 113 can send the authentication token 123 to the access library 143 for storage on the client device 106. The authentication service 113 could also specify a particular key-pair to be used for encrypting the authentication token 123 for storage on the client device 106. For example, the authentication service 113 could specify that a root key-pair 156 previously provisioned for the authentication service 113 be used. As another example, the authentication service 113 could specify that a specific application key-pair 129 provisioned as a subkey of a particular root key-pair 156 be used. Such an application key-pair 129 could have been provisioned, for example, for the purpose of protecting authentication tokens 123 specifically. To send the authentication token 123 and any other related data, the authentication service 113 could provide the authentication token 123, which in turn would provide the authentication token 123 and any other related data to the access library 143 (e.g., using one or more API calls).

Moving on to box 413, the access library 143 can encrypt and store the authentication token 123 in the client data store 159 as an encrypted authentication token 163. For example, the access library 143 could invoke one or more system calls provided by the operating system of the client device 106 or a device driver for the cryptographic coprocessor 146 to cause the cryptographic coprocessor 146 to encrypt the authentication token 123 using the public key of the specified key-pair. The encrypted authentication token 163 is then stored in the client data store 159 for later authentication.

Finally, at box 416, the access library 143 can return the results of the cryptographic operation performed at box 413. For example, the access library 143 might return a message indicating that the authentication token 123 was successfully encrypted and stored. In some implementations, the access library 143 could further provide a copy of the identity public key 131 to the authentication service 113 to allow the authentication service 113 to later verify the authenticity of any authentication token 123 provided by the client device 106 in a future authentication session. To return the results of the cryptographic operation, the results would be provided to the browser 139 as a result of the function invoked by the browser at box 413. The browser 139 could then provide the results as a response to the authentication service 113.

Figure 5:
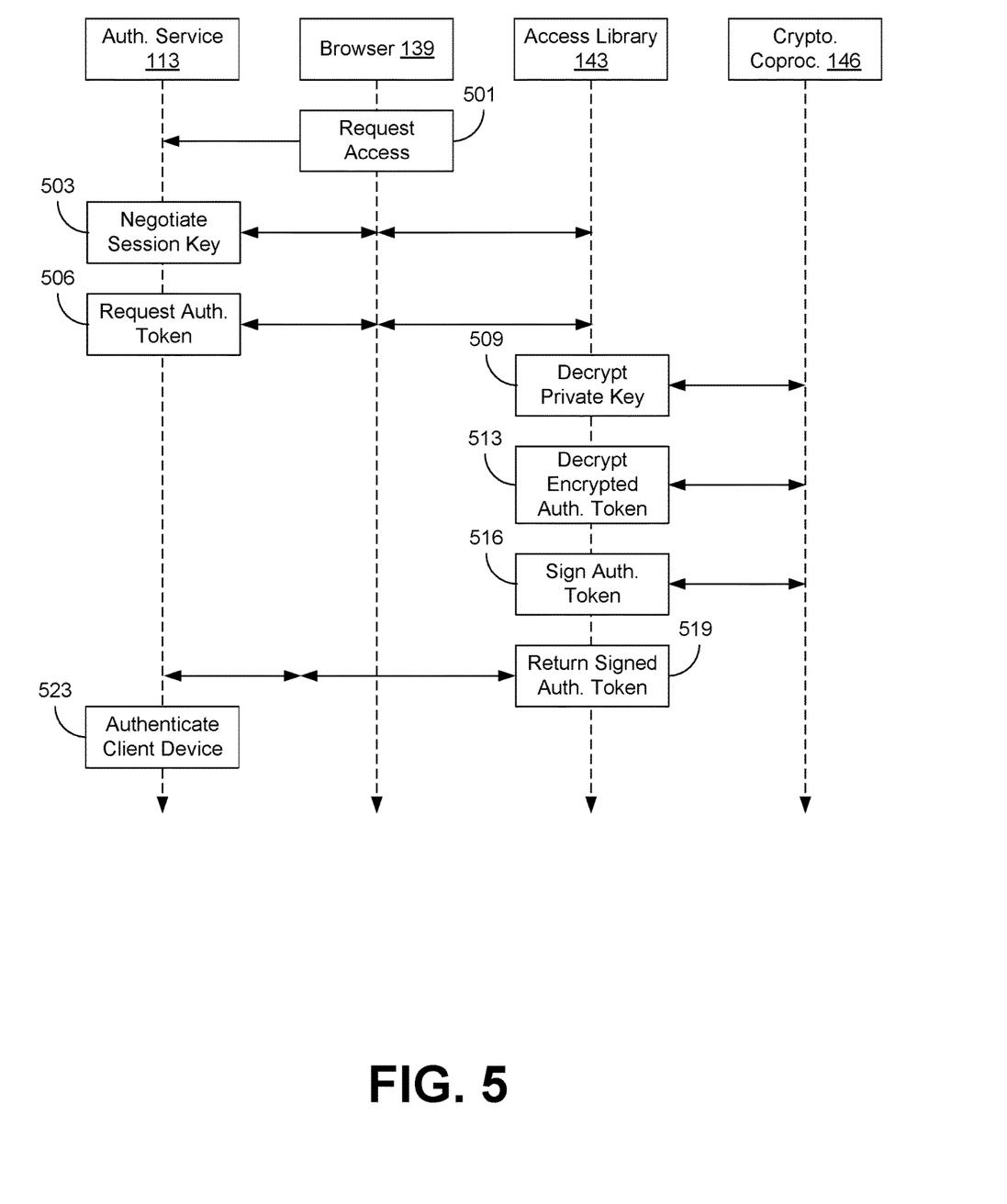
FIG. 5 is a sequence diagram illustrating one example of functionality implemented in the network environment of FIG. 1 according to various embodiments of the present disclosure.

Referring next to FIG. 5, shown is a sequence diagram that provides an example of the interactions between various components of the network environment 100 according to various embodiments of the present disclosure. The sequence diagram of FIG. 5 provides merely an example of the many different types of functional arrangements that can be employed in the network environment 100. As an alternative, the sequence diagram of FIG. 5 can be viewed as depicting an example of elements of a method implemented within the network environment 100.

Beginning with box 501, the browser 139 can request access to a computing resource that is protected by the authentication service 113. For example, a user could click on a link in a webpage to a website or webpage that requires a user to authenticate with the host.

Then at box 503, the authentication service 113 and the access library 143 can negotiate a session key to protect further communications from being intercepted or compromised by the browser 139. Any cryptographic key-exchange or key-agreement protocol can be used. Examples of such protocols include Diffie-Hellman Key Exchange (DHKE), Elliptic Curve Diffie-Hellman (ECDH) Key Exchange, and similar protocols. Any subsequent communications between the authentication service 113 and the access library 143 can then be encrypted before being relayed through the browser.

Next at box 506, the authentication service 113 can request an authentication token 123 from the client device 106. For example, the authentication service 113 may request the authentication token 123 as proof that the client device 106 has been previously authenticated on behalf of an authorized user. This could be done for convenience (e.g., if the client device 106 has a valid authentication token 123, additional authentication is not required) or as a further layer of security (e.g., authentication of a user can only proceed if a valid authentication token 123 is present on the client device 106). To request the authentication token 123, the authentication service 113 can send the request to the browser 139, which the browser 139 can relay on to the access library 143 (e.g., by invoking an API provided by the access library 143). The request can include a key-authorization credential 126 for a respective private key for the public key previously used to create the encrypted authentication token 163, as discussed in the sequence diagram of FIG. 4, and potentially an identifier for the private key.

At box 509, the access library 143 can decrypt the private key for the respective public key used to create the encrypted authentication token 163. For example, if an application key-pair 129 were used to create the encrypted authentication token 163, the access library 143 could use the key-authorization credential 126 received at box 506 to unlock or decrypt the encrypted private key 161. For example, the access library 143 could invoke one or more system calls provided by the operating system of the client device 106 or a device driver for the cryptographic coprocessor 146 to cause the cryptographic coprocessor 146 to decrypt the encrypted private key 161 using the key-authorization credential 126. If a root key-pair 156 were used, a similar operation could be used to access the private key for the root key-pair 156.

Then at box 513, the access library 143 can use the decrypted private key to decrypt the encrypted authentication token 163. For example, the access library 143 could invoke one or more system calls provided by the operating system of the client device 106 or a device driver for the cryptographic coprocessor 146 to cause the cryptographic coprocessor 146 to decrypt the encrypted authentication token 163 using the decrypted private key. As a result, the access library 143 now has access to the authentication token 123 in an unencrypted form.

Proceeding to box 516, the access library 143 can then sign the authentication token 123 using a private key of an identity key-pair 133 stored in the client data store 159 of the client device 106. For example, the access library 143 could invoke one or more system calls provided by the operating system of the client device 106 or a device driver for the cryptographic coprocessor 146 to cause the cryptographic coprocessor 146 to sign the authentication token 123 using the private key of the identity key-pair 133.

Moving on to box 519, the access library 143 can return the signed authentication token 123 to the authentication service 113. This could include both the authentication token 123 itself as well as the digital signature for the authentication token 123 created previously at box 516. To return the signed authentication token 123, the access library 143 could provide it to the browser 139 as a result of the function invoked by the browser at box 506. The browser 139 could then provide the results as a response to the authentication service 113.

Finally, at box 523, the authentication service 113 can authenticate the client device 106. For example, the authentication service 113 could compare the authentication token 123 returned from the access library 143 of the client device 106 to the authentication token 123 stored in the data store 116 of the computing environment 103. If the two authentication tokens 123 match, then the authentication service 113 could conclude that the identity of the client device 106 has been verified or authenticated. In addition, the authentication service 113 could further verify the cryptographic signature of the authentication service 113 using the identity public key 131 stored in the data store 116 of the computing environment 103. If the signature is valid, then the authentication service 113 could determine that the client device 106 is valid. Likewise, if the signature is invalid (e.g., because it was generated using an incorrect private key), then the authentication service 113 could determine that the client device 106 is an unauthorized attempt to impersonate an authorized device.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system comprising:
   a computing device in data communication over a network with a browser on a client device, the computing device comprising a processor and a memory;
   machine-readable instructions stored in the memory that, when executed by the processor, cause the computing device to at least:
   verify that a cryptographic coprocessor is installed on the client device by evaluating a response from the browser on the client device;
   send a request to the browser on the client device to provision an asymmetric encryption key-pair using the cryptographic coprocessor, wherein the browser on the client device relays the request to the cryptographic coprocessor, the request comprises a key-authorization credential for the asymmetric encryption key-pair, and the asymmetric encryption key-pair comprises a public key and a private key;
   receive, from the browser on the client device, the public key of the asymmetric encryption key-pair and an identity public key for the cryptographic coprocessor; and store the public key, key-authorization credential, and the identity public key in association with each other.

2. The system of claim 1, wherein machine-readable instructions further cause the computing device to at least, in response to a verification that the cryptographic coprocessor is installed on the client device, send the request to the browser on the client device to provision the asymmetric encryption key-pair using the cryptographic coprocessor.

3. The system of claim 1, wherein the request to provision the asymmetric encryption key-pair is a first request, the asymmetric encryption key-pair is a first asymmetric encryption key-pair, the public key is a first public key, the private key is a first private key, and the machine-readable instructions further cause the computing device to at least:
   send a second request to the browser on the client device to provision a second asymmetric encryption key-pair as a child key-pair of the first asymmetric encryption key-pair using the cryptographic coprocessor installed on the client device, wherein the second asymmetric encryption key-pair comprises a second public key and a second private key;
   receive, from the browser on the client device, the second public key; and
   store the second public key and the identity public key in association with each other.

4. The system of claim 1, wherein the request to provision the asymmetric encryption key-pair is a first request and the machine-readable instructions further cause the computing device to at least:
   send a second request to the browser on the client device to encrypt an authentication token and store the authentication token on the client device, wherein the request comprises a copy of the authentication token.

5. The system of claim 4, wherein the machine-readable instructions further cause the computing device to at least:
   verify an identity of a user of the client device; and
   the second request to encrypt the authentication token and store the authentication token is sent to the browser on the client device in response to a verification of the identity of the user of the client device.

6. The system of claim 5, wherein the machine-readable instructions further cause the computing device to at least:
   store an association between the authentication token and the identity of the user.

7. The system of claim 4, wherein the machine-readable instructions further cause the computing device to at least:
   receive an authentication request from the browser on the client device; and
   send a third request to the browser on the client device for the authentication token, wherein the third request includes a copy of the key-authorization credential.

8. The system of claim 5, wherein the cryptographic coprocessor installed on the client device complies with a specification for a version of the trusted protection module (TPM) standard.

9. A non-transitory, computer-readable medium comprising machine-readable instructions that, when executed by a processor of a first computing device, cause the first computing device to at least:
   send, by a browser on the first computing device, configuration data of the first computing device to a second computing device, wherein the configuration data comprises at least an indication that the first computing device has a cryptographic coprocessor installed on the first computing device;
   receive, by the browser on the first computing device, a request from the second computing device to provision an asymmetric encryption key-pair using the cryptographic coprocessor installed on the first computing device, wherein the request comprises a key-authorization credential for the asymmetric encryption key-pair;
   generate, by the cryptographic coprocessor on the first computing device, the asymmetric encryption key-pair, wherein the asymmetric encryption key-pair comprises a public key and a private key, wherein access to the private key is protected by the key-authorization credential;
   generate, by the cryptographic coprocessor on the first computing device, an identity key that uniquely identifies the cryptographic coprocessor; and
   provide, by the browser on the first computing device, the public key and the identity key to the second computing device.

10. The non-transitory, computer-readable medium of claim 9, wherein the request is a first request, the asymmetric encryption key-pair is a first asymmetric encryption key-pair, the public key is a first public key, the private key is a first private key, and the machine-readable instructions, when executed by the processor, further cause the first computing device to at least:
    receive, by the browser on the first computing device, a second request from the second computing device to provision a second asymmetric encryption key-pair using the cryptographic coprocessor installed on the first computing device;
    generate, by the cryptographic coprocessor on the first computing device, the second asymmetric encryption key-pair as a child key-pair of the first asymmetric encryption key-pair, the second asymmetric encryption key-pair comprising a second public key and a second private key; and
    provide, by the browser on the first computing device, the second public key to the second computing device.

11. The non-transitory, computer-readable medium of claim 9, wherein the machine-readable instructions, when executed by the processor, further cause the first computing device to at least:
    receive, by the browser on the first computing device, a request from the second computing device to encrypt an authentication token and store the authentication token;
    encrypt, by the cryptographic coprocessor on the first computing device, the authentication token using the public key to generate an encrypted authentication token; and
    store the encrypted authentication token.

12. The non-transitory, computer-readable medium of claim 11, wherein the machine-readable instructions, when executed by the processor, further cause the first computing device to at least:
    receive, by the browser on the first computing device, a request from the second computing device for the authentication token, the request comprising a copy of the key-authorization credential;
    access, by the cryptographic coprocessor on the first computing device, the private key using the key-authorization credential;
    decrypt, by the cryptographic coprocessor on the first computing device, the encrypted authentication token using the private key to recover the authentication token; and provide, by the browser on the first computing device, a copy of the authentication token to the second computing device.

13. The non-transitory, computer-readable medium of claim 9, wherein the cryptographic coprocessor installed on the first computing device complies with a specification for a version of the trusted protection module (TPM) standard.

14. A method implemented with a computing device over a network in data communication with a browser on a client device, the method comprising:
verifying that a cryptographic coprocessor is installed on the client device by evaluating a response from the browser on the client device;
sending a request to the browser on the client device to provision an asymmetric encryption key-pair using the cryptographic coprocessor, wherein the browser on the client device relays the request to the cryptographic coprocessor, the request comprises a key-authorization credential for the asymmetric encryption key-pair, and the asymmetric encryption key-pair comprises a public key and a private key;
receiving, from the browser on the client device, the public key of the asymmetric encryption key-pair and an identity public key for the cryptographic coprocessor; and
storing the public key, key-authorization credential, and the identity public key in association with each other.

15. The method of claim 14, further comprising in response to a verification that the cryptographic coprocessor is installed on the client device, sending the browser on the request to the client device to provision the asymmetric encryption key-pair using the cryptographic coprocessor.

16. The method of claim 14, wherein the request to provision the asymmetric encryption key-pair is a first request, the asymmetric encryption key-pair is a first asymmetric encryption key-pair, the public key is a first public key, the private key is a first private key, and the method further comprises:
sending a second request to the browser on the client device to provision a second asymmetric encryption key-pair as a child key-pair of the first asymmetric encryption key-pair using the cryptographic coprocessor installed on the client device, wherein the second asymmetric encryption key-pair comprises a second public key and a second private key;
receiving, from the browser on the client device, the second public key; and
storing the second public key and the identity public key in association with each other.

17. The method of claim 14, wherein the request to provision the asymmetric encryption key-pair is a first request and the method further comprises:
sending a second request to the browser on the client device to encrypt an authentication token and store the authentication token on the client device, wherein the request comprises a copy of the authentication token.

18. The method of claim 17, further comprising:
verifying an identity of a user of the client device; and
the second request to encrypt the authentication token and store the authentication token is sent to the browser on the client device in response to a verification of the identity of the user of the client device.

19. The method of claim 18, further comprising storing an association between the authentication token and the identity of the user.

20. The method of claim 17, further comprising:
receiving an authentication request from the browser on the client device; and
sending a third request to the browser on the client device for the authentication token, wherein the third request includes a copy of the key-authorization credential.

* * * * *